US011674073B2

United States Patent
Mandai et al.

(10) Patent No.: US 11,674,073 B2
(45) Date of Patent: Jun. 13, 2023

(54) DIVERTING AGENT AND METHOD OF FILLING FRACTURE IN WELL USING SAME

(71) Applicant: Mitsubishi Chemical Corporation, Tokyo (JP)

(72) Inventors: Shusaku Mandai, Tokyo (JP); Yasuhiro Hirano, Tokyo (JP); Ryosuke Taniguchi, Tokyo (JP); Chizuko Furo, Tokyo (JP); Kenji Furui, Tokyo (JP); Kenji Shinohara, Tokyo (JP); Ken Sato, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 17/397,244

(22) Filed: Aug. 9, 2021

(65) Prior Publication Data

US 2021/0363411 A1  Nov. 25, 2021

Related U.S. Application Data

(63) Continuation of application No. PCT/JP2020/005300, filed on Feb. 12, 2020.

(30) Foreign Application Priority Data

Feb. 13, 2019 (JP) ............................ JP2019-023947

(51) Int. Cl.
  *C09K 8/68* (2006.01)
  *C09K 8/70* (2006.01)
(52) U.S. Cl.
  CPC .  *C09K 8/68* (2013.01); *C09K 8/70* (2013.01)
(58) Field of Classification Search
  CPC . C09K 8/508; C09K 8/68; C09K 8/70; C09K 8/516; E21B 43/26; E21B 43/261; E21B 43/267; E21B 43/16; E21B 33/13
  See application file for complete search history.

(56) References Cited

U.S. PATENT DOCUMENTS

| | | |
|---|---|---|
| 2016/0122618 A1 | 5/2016 | Nguyen et al. |
| 2016/0298017 A1 | 10/2016 | Takahashi et al. |
| 2017/0253703 A1 | 9/2017 | Yoshikawa et al. |
| 2018/0010037 A1 | 1/2018 | Yoshikawa et al. |

FOREIGN PATENT DOCUMENTS

| | | | | |
|---|---|---|---|---|
| CA | 2917394 C | * | 1/2019 | ........... C04B 28/021 |
| CN | 102344788 A | | 2/2012 | |
| CN | 103725277 A | | 4/2014 | |
| CN | 105441047 A | * | 3/2016 | ............. C09K 8/506 |
| CN | 106867487 A | | 6/2017 | |
| CN | 107286916 A | | 10/2017 | |
| EP | 3733811 | | 11/2020 | |
| JP | 2016-56272 A | | 4/2016 | |
| JP | 2016-147971 A | | 8/2016 | |
| JP | 2016-147972 A | | 8/2016 | |
| WO | 2015/072317 A1 | | 5/2015 | |

OTHER PUBLICATIONS

Written Opinion issued in WIPO Patent Application No. PCT/JP2020/005300, dated May 12, 2020, English translation.
ISR issued in WIPO Patent Application No. PCT/JP2020/005300, dated May 12, 2020, English translation.
IPRP issued in WIPO Patent Application No. PCT/JP2020/005300, dated Aug. 10, 2021, English translation.
European Search Report issued with European application No. 20755810.7, dated Mar. 7, 2022.
Office Action issued in CN Patent Application No. 202080013465.4, dated Nov. 15, 2022, English translation.

* cited by examiner

*Primary Examiner* — Zakiya W Bates
(74) *Attorney, Agent, or Firm* — Greenblum & Bernstein, P.L.C.

(57) ABSTRACT

A diverting agent of the present invention contains a polyvinyl alcohol-based resin, wherein when the diverting agent is added to a 0.48 mass % aqueous solution of guar gum to prepare a mixed solution having a concentration of 12 mass %, a dispersion liquid obtained by dispersing the mixed solution at 30° C. for 60 minutes is pressurized and dehydrated at a pressure of 1 MPa using a pressure dehydration device including a drainage part having a slit having a width of 2 mm, and a regression line represented by an equation (A): $y=ax+b$ (in the equation (A), y is a cumulative dehydration amount (g), x is a square root of a time (minutes) elapsed from start of pressurization, a and b are a slope and an intercept of the regression line, respectively, and $0<x\leq2$) is calculated by a least squares method from a scatter diagram plotted on a graph in which the square root x of the time is plotted on a horizontal axis and the cumulative dehydration amount y is plotted on a vertical axis, a slope a of the equation (A) satisfies a condition (B): $a\leq80$.

5 Claims, No Drawings

DIVERTING AGENT AND METHOD OF FILLING FRACTURE IN WELL USING SAME

CLAIM FOR PRIORITY

This application is a Continuation of PCT/JP2020/005300 filed Feb. 12, 2020, and claims the priority benefit of Japanese application 2019-023947 filed Feb. 13, 2019, the contents of which are expressly incorporated by reference herein in their entireties.

TECHNICAL FIELD

The present invention relates to a diverting agent and a method of filling a fracture in a well using the diverting agent. More specifically, the present invention relates to a diverting agent to be used during construction of an excavation method using a hydraulic fracturing method, and a method of filling a fracture in a well using the diverting agent.

BACKGROUND ART

For collecting petroleum or other underground resources, a hydraulic fracturing method in which high-pressure water is injected into an underground shale layer to cause fractures is widely adopted. In the hydraulic fracturing method, at first, a vertical hole (vertical well) with a depth of several thousand of meters is excavated vertically by a drill, and then, when the vertical hole reaches the shale layer, a horizontal hole (horizontal well) with a diameter of ten to several tens of centimeters is excavated horizontally. By filling the vertical well and the horizontal well with a fluid and pressurizing the fluid, fractures are generated from the well. Natural gas, petroleum (shale gas/oil), or the like in the shale layer flows out from the fractures, and is then collected. According to such a method, a resource inflow cross-section of the well can be increased by generation of fractures and underground resources can be efficiently collected.

In the hydraulic fracturing method described above, prior to generation of fractures by fluid pressurization, preliminary blasting called perforation is performed in the horizontal well. By such preliminary blasting, borings are made from the well to a production layer. After that, by injecting a fracturing fluid into the well, the fluid flows into these borings, and a load is applied to the borings. Then, fractures are generated in these borings and grow into fractures in a size suitable for resource collection.

In the hydraulic fracturing method, a part of fractures that have already been generated are temporarily filled with an additive called a diverting agent in order to grow fractures that have already been generated larger or to generate more fractures. By temporarily filling a part of the fractures with the diverting agent and pressurizing the fracturing fluid filled in the well in this state, the fluid may enter other fractures, so that other fractures can grow larger or new fractures can be generated.

Since the diverting agent is used to temporarily fill the fractures as described above, a diverting agent which can maintain the shape for a certain period of time and disappears by hydrolysis when natural gas, petroleum, or the like is collected is used. For example, various techniques in which a hydrolyzable resin such as polyglycolic acid or polylactic acid is used as a diverting agent have been proposed.

PTL 1 has proposed a temporary sealing agent for use in well boring, which contains polyglycolic acid having high biodegradability among biodegradable aliphatic polyester-based resins.

In addition, PTL 2 has proposed a powder containing particles of polylactic acid which is a biodegradable resin, and in the powder, 50 mass % or more of particles do not pass through a sieve having an opening of 500 µm and the particles have an angle of repose of 51 degrees or more.

Further, PTL 3 has proposed hydrolyzable particles having a dispersion structure in which fine particles of a polyoxalate having a high biodegradability for adjusting the hydrolysis performance of polylactic acid are distributed in the polylactic acid, and having an average particle diameter ($D_{50}$) in a range of 300 µm to 1,000 µm and a roundness, that is, a minor axis/major axis ratio, of 0.8 or more.

Furthermore, PTL 4 has proposed polyoxalate particles having an average particle diameter ($D_{50}$) in a range of 300 µm to 1,000 µm and a roundness, that is, a minor axis/major axis ratio, of 0.8 or more.

CITATION LIST

Patent Literature

PTL 1: WO 2015/072317
PTL 2: JP-A-2016-56272
PTL 3: JP-A-2016-147971
PTL 4: JP-A-2016-147972

SUMMARY OF INVENTION

Technical Problem

Polyglycolic acid or polylactic acid conventionally used is a water-insoluble resin, and there is a problem that it takes a considerable amount of time for removal.

In addition, the hydraulic fracturing method, it is necessary to sufficiently fill the fractures that have already bee generated in order to grow the fractures or generate new fractures. The conventional diverting agent has an inadequate filling retention time for the fractures, and when a fracturing fluid is pressurized, the fluid infiltrates the fractures, and it is not possible to sufficiently grow other fractures or generate new fractures, which may reduce work efficiency.

Therefore, the present invention has been made to solve the above problems, and an object thereof is to provide a diverting agent which improves durability of a filling time for fractures in a well and can be easily removed by dissolution in water after the filling is no longer necessary in an excavation method using a hydraulic fracturing method.

Solution to Problem

As a result of intensive studies, the present inventors have found that by using a diverting agent in which a slope a is less than or equal to a specific value when a specific pressure dehydration test is performed, a cumulative dehydration amount is plotted with respect to a square root of a pressurization time, and a regression line y=ax+b is drawn by the least squares method, the above problems can be solved. Thus, the present invention has been completed.

That is, the present invention is characterized in the following (1) to (5).

(1) A diverting agent, containing:
a polyvinyl alcohol-based resin, wherein
when the diverting agent is added to a 0.48 mass % aqueous solution of guar gum to prepare a mixed solution having a concentration of 12 mass % of the diverting agent, the mixed solution is dispersed at 30° C. for 60 minutes to obtain a dispersion liquid, the dispersion liquid is pressurized and dehydrated at a pressure of 1 MPa using a pressure dehydration device including a drainage part having a slit having a width of 2 mm, a cumulative dehydration amount y with respect to a square root x of a time is obtained, and a regression line represented by the following equation (A) is calculated by a least squares method from a scatter diagram plotted on a graph in which the square root x of the time is plotted on a horizontal axis and the cumulative dehydration amount y is plotted on a vertical axis, a slope a of the equation (A) satisfies the following condition (B)

$$y=ax+b \tag{A}$$

$$a \leq 80 \tag{B}$$

(in the equation (A), y is the cumulative dehydration amount (g), x is the square root of the time (minutes) elapsed from start of pressurization, a and b are the slope and an intercept of the regression line, respectively, and $0<x\leq 2$).

(2) The diverting agent according to (1), wherein the polyvinyl alcohol-based resin contains two or more types of resin particles that are in the form of particles and have different average particle diameters.

(3) The diverting agent according to (1) or (2), wherein the polyvinyl alcohol-based resin contains a modified polyvinyl alcohol-based resin.

(4) A method for preparing a diverting agent for temporarily filling a fracture generated in a well, the method including:
incorporating a polyvinyl alcohol-based resin, wherein
when the diverting agent is added to a 0.48 mass % aqueous solution of guar gum to prepare a mixed solution having a concentration of 12 mass % of the diverting agent, the mixed solution is dispersed at 30° C. for 60 minutes to obtain a dispersion liquid, the dispersion liquid is pressurized and dehydrated at a pressure of 1 MPa using a pressure dehydration device including a drainage part having a slit having a width of 2 mm, a cumulative dehydration amount y with respect to a square root x of a time is obtained, and a regression line represented by the following equation (A) is calculated by a least squares method from a scatter diagram plotted on a graph in which the square root x of the time is plotted on a horizontal axis and the cumulative dehydration amount y is plotted on a vertical axis, a slope a of the equation (A) satisfies the following condition (B)

$$y=ax+b \tag{A}$$

$$a \leq 80 \tag{B}$$

(in the equation (A), y is the cumulative dehydration amount (g), x is the square root of the time (minutes) elapsed from start of pressurization, a and b are the slope and an intercept of the regression line, respectively, and $0<x\leq 2$).

(5) A method of temporarily filling a fracture generated in a well, the method including: allowing the diverting agent according to any one of (1) to (3) to flow into a fracture with a flow of a fluid in the well.

Advantageous Effects of Invention

The diverting agent of the present invention contains a water-soluble polyvinyl alcohol-based resin, and the diverting agent has a slope a of 80 or less in the regression line represented by the equation (A) calculated by performing the above specific pressure dehydration test. It is shown that when the slope is small, the condition that the water hardly flows is continued, and when the value is 80 or less, it can be said that durability of the time for filling the fractures is exhibited. Therefore, the diverting agent of the present invention has a sufficient filling property against fractures in the well, and also has durability for the filling time. Since the polyvinyl alcohol-based resin is water-soluble, the diverting agent of the present invention dissolves in water and is easily removed after filling.

Therefore, the diverting agent of the present invention can be suitably used for a hydraulic fracturing method performed in a drilling operation for natural gas, petroleum, or the like.

DESCRIPTION OF EMBODIMENTS

Hereinafter, the present invention will be explained in detail, but the following explanations only show an example of preferred embodiments, the present invention is not limited thereto.

The term "polyvinyl alcohol" is sometimes simply referred to as "PVA".

In the present description, (meth)allyl means allyl or methallyl, (meth)acryl means acryl or methacryl, and (meth)acrylate means acrylate or methacrylate.

Further, in the present description, "mass" has the same meaning as "weight".

A diverting agent of the present invention contains a polyvinyl alcohol (PVA)-based resin, in which when the diverting agent is added to a 0.48 mass % aqueous solution of guar gum to prepare a mixed solution having a concentration of 12 mass % of the diverting agent, the mixed solution is dispersed at 30° C. for 60 minutes to obtain a dispersion liquid, the dispersion liquid is pressurized and dehydrated at a pressure of 1 MPa using a pressure dehydration device including a drainage part having a slit having a width of 2 mm, a cumulative dehydration amount y with respect to a square root x of a time is obtained, and a regression line represented by the following equation (A) is calculated by a least squares method from a scatter diagram plotted on a graph in which the square root x of the time is plotted on a horizontal axis and the cumulative dehydration amount y is plotted on a vertical axis, a slope a of the equation (A) satisfies the following condition (B).

$$y=ax+b \tag{A}$$

$$a \leq 80 \tag{B}$$

(In the equation (A), y is the cumulative dehydration amount (g), x is the square root of the time (minutes) elapsed from start of pressurization, a and b are the slope and an intercept of the regression line, respectively, and $0<x\leq 2$.)

The equation (A) is a regression line obtained by the least squares method from a scatter diagram plotted on a graph, in which a square root x of a time is plotted a horizontal axis and a cumulative dehydration amount y is plotted on a vertical axis, after performing the specific pressure dehydration test and obtaining the cumulative dehydration amount y with respect to the square root x of the time (minutes). In the equation (A), when $0<x\leq 2$, that is, within 4 minutes after the start of pressurization, the slope a is 80 or less. When the slope a is 80 or less, it is shown that the dehydration amount is small, and it can be said that water is difficult to flow. Therefore, a filling property for fractures is exhibited for a certain period of time (a period until the PVA-based resin begins to dissolve), and in addition, the durability of the filling time is exhibited. The slope a is preferably 75 or less, and more preferably 70 or less. The lower limit is not particularly limited, and is usually larger than 0.

In the equation (A), the intercept b is a variable determined by the slope a. A certain amount of dehydration occurs at the moment of pressurization, which allows the diverting agent to be optimally arranged to fill a slit of a pressure dehydration device. Based on the above, the dehydration amount, i.e., the intercept b, at 0 minute after the start of pressurization is not particularly limited, and is preferably 50 g or less, and more preferably 30 g or less.

Hereinafter, the PVA-based resin for use in the present invention will be described.

[PVA-Based Resin]

The PVA-based resin for use in the present invention is a resin containing, as a main structural unit, a vinyl alcohol structural unit obtained by saponification of a polyvinyl ester-based resin obtained by polymerization of a vinyl ester-based monomer, and has a vinyl alcohol structural unit corresponding to the degree of saponification and a vinyl acetate structural unit of an unsaponified moiety.

In the present invention, examples of the PVA-based resin include a modified PVA-based resin obtained by copolymerizing various monomers during the production of a polyvinyl ester-based resin and being saponified, and a variety of post-modified PVA-based resins obtained by introducing various functional groups into an unmodified PVA-based resin by post-modification, in addition to an unmodified PVA-based resin. Such modification can be performed as long as the water solubility of the PVA-based resin is not lost. In some cases, the modified PVA-based resin may be further post-modified.

The average polymerization degree (measured according to JIS K 6726:1994) of the PVA-based resin for use in the present invention is preferably 100 to 3500. When the average polymerization degree is too small, the PVA-based resin is easily dissolved and the filling property cannot be exhibited, and when the average polymerization degree is too large, the dissolution rate is slow and the PVA-based resin is difficult to dissolve after a certain period of time. Therefore, the average polymerization degree is more preferably 200 to 2500, and still more preferably 300 to 2000, from the viewpoint of the durability of the filling property and solubility after a certain period of time.

The degree of saponification (measured according to JIS K 6726:1994) of the PVA-based resin is preferably 60 mol % to 100 mol %. When the degree of saponification is too low, the water solubility tends to decrease. From the viewpoint of the filling property against gaps in the fractures, the degree of saponification is more preferably 90 mol % or more, and still more preferably 95 mol % or more. The upper limit is more preferably 99.8 mol % or less, and still more preferably 99.5 mol % or less.

The melting point of the PVA-based resin is preferably 140° C. to 250° C., more preferably 150° C. to 245° C., still more preferably 160° C. to 240° C., and particularly preferably 170° C. to 230° C.

The melting point is a value measured with a differential scanning calorimeter (DSC) at a temperature rising/falling rate of 10°/min.

The viscosity of a 4 mass % aqueous solution of the PVA-based resin is preferably 2 mPa·s to 85 mPa·s, more preferably 2.5 mPa·s to 80 mPa·s, still more preferably 3 mPa s to 75 mPa·s, and particularly preferably 3.5 mPa·s to 70 mPa·s. When the viscosity is too low, the effects of the present application tend to be difficult to obtain, and when the viscosity is too high, the production tends to be difficult.

The viscosity of the 4 mass % aqueous solution of the PVA-based resin is a viscosity at 20° C. measured in accordance with JIS K 6726:1994, by preparing a 4 mass % aqueous solution of the PVA-based resin.

In the present invention, a modified PVA-based resin into which a functional group is introduced may be used as the PVA-based resin. For example, preferred is a PVA-based resin having a primary hydroxy group in the side chain or an ethylene-modified PVA-based resin, and particularly preferred is a PVA-based resin having a primary hydroxy group in the side chain in terms of being excellent in melt moldability. The number of the primary hydroxy group in the PVA-based resin having a primary hydroxy group in the side chain is preferably 1 to 5, more preferably 1 to 2, and particularly preferably 1. In addition to the primary hydroxy group, a secondary hydroxy group is preferably contained.

Examples of such a PVA-based resin having a primary hydroxy group in the side chain include a modified PVA-based resin having a 1,2-diol structural unit in the side chain and a modified PVA-based resin having a hydroxyalkyl group structural unit in the side chain. Among these, it is particularly preferable to use a modified PVA-based resin having a 1,2-diol structural unit in the side chain (hereinafter, may be referred to as "modified PVA-based resin having a side-chain 1,2-diol structural unit") represented by the following general formula (1).

The moiety other than the 1,2-diol structural unit is a vinyl alcohol structural unit and a vinyl ester structural unit in an unsaponified moiety, similar to a general PVA-based resin.

[Chem. 1]

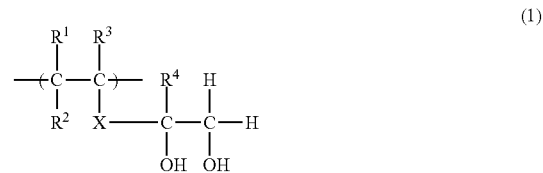

(1)

(In the general formula (1), $R^1$ to $R^4$ each independently represent a hydrogen atom or an alkyl group having 1 to 4 carbon atoms, and X represents a single bond or a bond chain.)

In the above general formula (1), $R^1$ to $R^4$ each independently represent a hydrogen atom or an alkyl group having 1 to 4 carbon atoms. $R^1$ to $R^4$ are preferably all hydrogen atoms, however may be an alkyl group having 1 to 4 carbon atoms as long as the resin properties are not remarkably impaired. The alkyl group is not particularly limited, and is preferably, for example, a methyl group, an ethyl group, an n-propyl group, an isopropyl group, an n-butyl group, an isobutyl group, and a tert-butyl group. The alkyl group may have a substituent such as a halogen group, a hydroxy group, an ester group, a carboxylic acid group, or a sulfonic acid group as needed.

In the above general formula (1), X is a single bond or a bond chain, preferably a single bond in terms of thermal stability and stability under high temperature and acidic conditions, but may be a bond chain as long as the effect of the present invention is not impaired.

Such a bond chain is not particularly limited, and examples thereof include hydrocarbon groups such as an alkylene group, an alkenylene group, an alkynylene group, a phenylene group, and a naphthylene group (these hydrocarbon groups may be substituted with a halogen atom such as a fluorine atom, a chlorine atom or a bromine atom), —O—, —(CH$_2$O)$_m$—, —(OCH$_2$)$_m$—, —(CH$_2$O)$_m$CH$_2$—, —CO—, —COCO—, —CO(CH$_2$)$_m$CO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —Al(OR)—, —OAl(OR)—, and —OAl(OR)O—. Each R is independently a hydrogen atom or an optional substituent, and is preferably a hydrogen atom or an alkyl group (particularly an alkyl group having 1 to 4 carbon atoms). In addition, m is a natural number, and is preferably 1 to 10, particularly preferably 1 to 5. Among these, the bond chain is preferably an alkylene group having 6 or less carbon atoms, particularly a methylene group, or —CH$_2$OCH$_2$— in terms of viscosity stability and heat resistance during production.

In a particularly preferred structure of the 1,2-diol structural unit represented by the general formula (1), $R^1$ to $R^4$ are all hydrogen atoms, and X is a single bond.

In a case where the PVA-based resin is a modified PVA-based resin, the modification rate in this modified PVA-based resin, that is, the content of a structural unit derived from various monomers in the copolymer, or the content of functional groups introduced by a post-reaction cannot be said unconditionally because the characteristics vary greatly depending on the type of the functional group, and is preferably 0.1 mol % to 20 mol %.

For example, the modification rate when the PVA-based resin is the modified PVA-based resin having a side-chain 1,2-diol structural unit is preferably 0.1 mol % to 20 mol %, more preferably 0.5 mol % to 10 mol %, still more preferably 1 mol % to 8 mol %, and particularly preferably 1 mol % to 3 mol %. When the modification rate is too high, the fractures in the well cannot be filled temporarily, and when the modification rate is too low, the solubility after a certain period of time tends to deteriorate.

The content (modification rate) of the 1,2-diol structural unit in the PVA-based resin can be determined from a $^1$H-NMR spectrum (solvent: DMSO-d$_6$, internal standard: tetramethylsilane) of a PVA-based resin having a degree of saponification of 100 mol %. Specifically, the content can be calculated based on the peak areas derived from a hydroxy proton, a methine proton, and a methylene proton in the 1,2-diol structural unit, a methylene proton in the main chain, a proton of a hydroxy group linked to the main chain, and the like.

The modification rate when the PVA-based resin is an ethylene-modified PVA-based resin is preferably 0.1 mol % to 15 mol %, more preferably 0.5 mol % to 10 mol %, still more preferably 1 mol % to 10 mol %, and particularly preferably 5 mol % to 9 mol %. When the modification rate is too high, the water solubility tends to decrease; when the modification rate is too low, the melt molding tends to be difficult.

Examples of a method for producing the PVA-based resin used in the present invention include a method of polymerizing vinyl ester-based monomers and performing saponification of the obtained polyvinyl ester polymer.

Examples of the vinyl ester-based monomer include vinyl acetate, vinyl propionate, vinyl butyrate, vinyl caproate, vinyl caprylate, vinyl caprate, vinyl laurate, vinyl myristate, vinyl palmitate, vinyl stearate, vinyl cyclohexanecarboxylate, vinyl piperate, vinyl octylate, vinyl monochloroacetate, vinyl adipate, vinyl methacrylate, vinyl crotonate, vinyl sorbate, vinyl benzoate, vinyl cinnamate, and vinyl trifluoroacetate. From the viewpoint of price and availability, vinyl acetate is preferably used.

Examples of the monomer for use in the copolymerization of the vinyl ester-based monomer in the production of the vinyl ester-based resin include: olefins such as ethylene, propylene, isobutylene, α-octene, α-dodecene, and α-octadecene; unsaturated acids such as an acrylic acid, a methacrylic acid, a crotonic acid, a maleic acid, a maleic anhydride, and an itaconic acid, or a salt thereof, a mono-, di-alkyl ester thereof or the like; nitriles such as acrylonitrile and methacrylonitrile; amides such as acrylamide and methacrylamide; olefin sulfonic acids such as an ethylene sulfonic acid, an allyl sulfonic acid, and a methallyl sulfonic acid or a salt thereof; alkyl vinyl ethers; N-acrylamidomethyltrimethylammonium chloride; allyltrimethylammonium chloride; dimethylallyl vinyl ketone; N-vinyl pyrrolidone; vinyl chloride; vinylidene chloride; polyoxyalkylene (meth)allyl ethers such as polyoxyethylene (meth)allyl ether and polyoxypropylene (meth)allyl ether; polyoxyalkylene (meth)acrylates such as polyoxyethylene (meth)acrylate and polyoxypropylene (meth)acrylate; polyoxyalkylene (meth)acrylamides such as polyoxyethylene (meth)acrylamide and polyoxypropylene (meth)acrylamide; polyoxyethylene[1-(meth)acrylamide-1,1-dimethylpropyl] ester; polyoxyalkylene vinyl ethers such as polyoxyethylene vinyl ether and polyoxypropylene vinyl ether; polyoxyalkylene allylamines such as polyoxyethylene allylamine and polyoxypropylene allylamine; polyoxyalkylene vinylamines such as polyoxyethylene vinylamine and polyoxypropylene vinylamine; and hydroxy group-containing α-olefins such as 3-buten-1-ol, 4-penten-1-ol, and 5-hexen-1-ol, or derivatives such as an acylated product thereof.

In addition, examples thereof include diol-containing compounds such as 3,4-dihydroxy-1-butene, 3,4-diacyloxy-1-butene, 3-acyloxy-4-hydroxy-1-butene, 4-acyloxy-3-hydroxy-1-butene, 3,4-diacyloxy-2-methyl-1-butene, 4,5-dihydroxy-1-pentene, 4,5-diasiloxy-1-pentene, 4,5-dihydroxy-3-methyl-1-pentene, 4,5-diasiloxy-3-methyl-1-pentene, 5,6-dihydroxy-1-hexene, 5,6-diasiloxy-1-hexene, glycerin monoallyl ether, 2,3-diacetoxy-1-allyloxypropane, 2-acetoxy-1-allyloxy-3-hydroxypropane, 3-acetoxy-1-allyloxy-2-hydroxypropane, glycerin monovinyl ether, glycerin monoisopropenyl ether, vinyl ethylene carbonate, and 2,2-dimethyl-4-vinyl-1,3-dioxolane.

The polymerization of the vinyl ester-based monomers or the polymerization of the vinyl ester-based monomer and a copolymerizable monomer can be performed by any known polymerization method such as solution polymerization, suspension polymerization, and emulsion polymerization. Among these, it is preferable to perform the solution polymerization which can remove reaction heat efficiently under reflux.

Examples of a solvent for use in the polymerization include aliphatic alcohols having 1 to 4 carbon atoms such as methanol, ethanol, isopropyl alcohol, n-propanol, and butanol, or ketones such as acetone and methyl ethyl ketone. A lower alcohol having 1 to 3 carbon atoms is preferably used.

For the saponification of the obtained polymer, a conventional known saponification method can be employed. That is, the saponification can be performed using an alkali catalyst or an acid catalyst in a state where the polymer is dissolved in an alcohol or a water/alcohol solvent.

As the alkali catalyst, for example, alkali metal hydroxides such as potassium hydroxide, sodium hydroxide, sodium methylate, sodium ethylate, potassium methylate, and lithium methylate, or alcoholate can be used.

Among these, saponification is preferably performed by a transesterification reaction using an alkali catalyst in the presence of an anhydrous alcohol solvent in terms of reaction rate or reduction of impurities such as fatty acid salts.

The reaction temperature of the saponification reaction is preferably 20° C. to 60° C. When the reaction temperature is too low, the reaction rate tends to decrease and the reaction efficiency tends to decrease; when the reaction temperature is too high, the reaction temperature may exceed the boiling point of the reaction solvent, and the safety in production tends to decrease. In a case of performing the saponification under a high pressure using a tower-type continuous saponification tower with high pressure resistance, the saponification can be performed at a higher temperature, for example, 80° C. to 150° C., and a PVA-based resin having a high degree of saponification can be obtained in a short time even using a small amount of saponification catalyst.

The modified PVA-based resin having a side-chain 1,2-diol structural unit can be produced by a known production method. For example, the above modified PVA-based resin can be produced by a method described in JP-A-2002-284818, JP-A-2004-285143, or JP-A-2006-95825. That is, the above modified PVA-based resin can be produced by (i) a method of saponifying a copolymer of a vinyl ester-based monomer and a compound represented by the following general formula (2), (ii) a method of saponifying and decarboxylating a copolymer of a vinyl ester-based monomer and a vinyl ethylene carbonate represented by the following general formula (3), (iii) a method of saponifying and deketalizing a copolymer of a vinyl ester-based monomer and a 2,2-dialkyl-4-vinyl-1,3-dioxolane represented by the following general formula (4), or the like.

[Chem. 2]

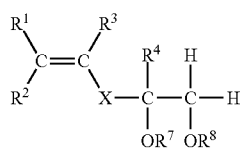

(2)

(In the general formula (2), $R^1$ to $R^4$ each independently represent a hydrogen atom or an alkyl group having 1 to 4 carbon atoms, X represents a single bond or a bond chain, and $R^7$ and $R^8$ each independently represent a hydrogen atom or $R^9$—CO— (wherein, $R^9$ is an alkyl group having 1 to 4 carbon atoms))

[Chem. 3]

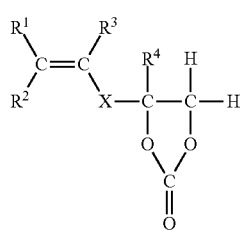

(3)

(In the general formula (3), $R^1$ to $R^4$ each independently represent a hydrogen atom or an alkyl group having 1 to 4 carbon atoms, and X represents a single bond or a bond chain)

[Chem. 4]

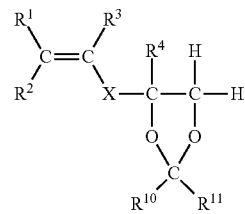

(4)

(In the general formula (4), $R^1$ to $R^4$ each independently represent a hydrogen atom or an alkyl group having 1 to 4 carbon atoms, X represents a single bond or a bond chain, and $R^{10}$ and $R^{11}$ each independently represent a hydrogen atom or an alkyl group having 1 to 4 carbon atoms.)

Specific examples and preferred examples of $R^1$ to $R^4$ and X in the general formulas (2) to (4) are the same as those in the above general formula (1), and specific examples and preferred examples of the alkyl group having 1 to 4 carbon atoms of $R^7$ to $R^{11}$ are also the same as those of the general formula (1).

Among the above methods (i) to (iii), the method (i) is preferred in that copolymerization reactivity and industrial handling are excellent. In particular, as the compound represented by the general formula (2), it is preferable to use 3,4-diacyloxy-1-butene in which $R^1$ to $R^4$ are hydrogen atoms, X is a single bond, $R^7$ and $R^8$ are $R^9$—CO—, and $R^9$ is an alkyl group having 1 to 4 carbon atoms. Among these, 3,4-diacetoxy-1-butene in which $R^9$ is a methyl group is particularly preferably used.

The PVA-based resin is preferably used in the form of particles. The shape of the particles is not particularly limited, and examples thereof include a spherical shape, a powder shape, an elliptical shape, and a pellet molded body (cylindrical, plate, cube, rectangular prismatic, polygonal, etc.).

The particle diameter of the PVA-based resin particles is appropriately adjusted in consideration of the size of the fractures in the well, the shape of the particles, and the like, and is preferably in the range of 0.1 mm to 5 mm.

Specifically, in a case where the PVA-based resin particles are cylindrical particles (pellet molded body), for the average particle diameter thereof, the diameter of the ross section orthogonal to the axial direction is preferably 0.5 mm to 5.0 mm, more preferably 1.0 mm to 4.5 mm, and still more preferably 1.5 mm to 4.0 mm, and the thickness (length in the axial direction) is preferably 0.5 mm to 5.0 mm, more preferably 1.0 mm to 4.5 mm, and still more preferably 1.5 mm to 4.0 mm.

In a case where the PVA-based resin particles are spherical particles, the particles are preferably in the form of powder, and the average particle diameter thereof is 200 μm to 2,000 μm, and preferably 400 μm to 1,500 μm.

The average particle diameter can be measured by a dry sieving test method (see JIS Z 8815:1994). In the present description, the particle diameter is a diameter at which integrated value (cumulative distribution) is 50% when a particle diameter-based volume distribution is measured by a dry sieving test method.

When the sizes (the diameter, the length, and the average particle diameter) are too large, the water solubility tends to decrease, and when the sizes are too small, the sealing effect tends to decrease.

The PVA-based resin for use in the present invention may be composed of one type of resin, or may be a mixture of two or more types of resins. In the case of using two or more types of PVA-based resins, for example, a combination of two or more unmodified PVA-based resins having different degrees of saponification, average polymerization degrees, or melting points; a combination of an unmodified PVA-based resin and a modified PVA-based resin; a combination of two or more modified PVA-based resins having different degrees of saponification, average polymerization degrees, melting points, functional group types or modification rates; a combination of a PVA-based resin produced by melt molding and a PVA-based resin obtained without melt molding; or a combination of PVA-based resins having different shapes or average particle diameters is used.

Among these, the PVA-based resin is preferably a mixture of two or more types of PVA-based resin particles having different average particle diameters. When particles having different average particle diameters are combined, PVA-based resin particles having a large average particle diameter serve as scaffolding in the fractures, and PVA-based resin particles having a small average particle diameter fill the gaps therebetween, therefore increasing the density of the diverting agent in the fractures and improving the filling property.

In a case of using a combination of PVA-based resin particles having a large average particle diameter and PVA-based resin particles having a small average particle diameter, when the content of the PVA-based resin particles having a large average particle diameter is too high, it may not be possible to sufficiently fill the gaps between the particles with the PVA-based resin particles having a small average particle diameter. Therefore, the ratio (mass ratio) of the former:the latter is preferably 60:40 to 5:95, and more preferably 50:50 to 10:90.

Further, three or more types of PVA-based resin particles having different average particle diameters may be mixed at an optional ratio.

When dispersed in water, the PVA-based resin absorbs water and swells, and then gradually dissolves. The PVA-based resin of the present invention begins to dissolve in 1 to 5 days, and preferably completely dissolves in 2 to 15 days, more preferably 3 to 10 days.

The dissolution time of the PVA-based resin can be adjusted by adjusting the degree of saponification, the modification rate, the average polymerization degree, the average particle diameter, the heat treatment degree, etc. of the PVA-based resin.

[Diverting Agent]

The diverting agent of the present invention contains the above PVA-based resin. The content of the PVA-based resin is preferably 50 mass % to 100 mass %, more preferably 80 mass % to 100 mass %, and still more preferably 90 mass % to 100 mass % with respect to the entire diverting agent. When the content is too small, the effects of the present invention tend to be difficult to obtain.

In addition to the PVA-based resin, additives (agents) such as sand, iron, ceramic, and other biodegradable resins can be blended in the diverting agent of the present invention as long as the effect of the present invention is not impaired.

The amount of the additive (agent) to be blended is preferably 50 mass % or less, more preferably 20 mass % A or less, and still more preferably 10 mass % or less with respect to the entire diverting agent.

The diverting agent can be produced by uniformly mixing the PVA-based resin of the present invention with other additives (agents), if necessary.

As described above, in the diverting agent of the present invention, when the diverting agent is added to a 0.48 mass % h aqueous solution of guar gum to prepare a mixed solution having a concentration of 12 mass % of the diverting agent, the mixed solution is dispersed at 30° C. for 60 minutes to obtain a dispersion liquid, the dispersion liquid is pressurized and dehydrated at a pressure of 1 MPa using a pressure dehydration device including a drainage part having a slit having a width of 2 mm, a cumulative dehydration amount y with respect to a square root x of a time is obtained, and a regression line represented by the following equation (A) is calculated by a least squares method from a scatter diagram plotted on a graph in which the square root x of the time is plotted on a horizontal axis and the cumulative dehydration amount y is plotted on a vertical axis, a slope a of the equation (A) satisfies the following condition (B).

$$y=ax+b \quad (A)$$

$$a \leq 80 \quad (B)$$

(In the equation (A), y is the cumulative dehydration amount (g), x is the square root of the time (minutes) elapsed from start of pressurization, a and b are the slope and an intercept of the regression line, respectively, and $0<x\leq 2$).

Examples of the pressure dehydration device include "HPHT Filter Press 500CT" (trade name) manufactured by Fann Instrument Company.

In the above equation (A), x is the square root of the time (minutes) elapsed from the start of pressurization, and y is the cumulative dehydration amount (g). a and b are the slope and the intercept of the regression line. The slope a represents the ease of flow of water in the diverting agent dispersion, and the intercept b is a variable determined by the slope a and is a value that serves as a standard for the dehydration amount at 0 minute after the start of pressurization.

When the slope a is 80 or less under the condition of $0<x\leq 2$, the dehydration amount is small and the filling property is exhibited for a certain period of time (a period until the PVA-based resin begins to dissolve), and in addition, the durability of the filling time for the fractures can be exhibited.

In order to make a in the equation (A) 80 or less, for example, a method of adjusting the physical properties of the PVA-based resin to be used, a method of adjusting the combination of the PVA-based resins, a method of adjusting the combination of the PVA-based resin and another additive (agent), and the like can be used. Examples of the method of adjusting the physical properties of the PVA-based resin include adjusting the degree of saponification, the modification rate, the average polymerization degree, the average particle diameter, or the heat treatment degree.

By adjusting the above, it is possible to prepare a diverting agent that satisfies the equation (A) and the condition (B) when the above specific pressure dehydration test is performed.

When petroleum, natural gas, or the like is excavated in a hydraulic fracturing method, the diverting agent of the present invention can enter fractures or fissures formed in the well, and then temporarily fill the fractures or fissures. When the regression line represented by the equation (A) is calculated based on the above pressure dehydration test, the slope a in the equation (A) is 80 or less, so that the diverting agent of the present invention has an excellent filling property in fractures or fissures, and also has durability of the filling time. Therefore, new fractures or fissures can be formed in a state where the fractures are temporarily filled by the diverting agent of the present invention. As a method for filling the fractures or fissures, the diverting agent of the present invention is allowed to flow into the fractures with a flow of fluid in the well. Accordingly, the fractures to be filled can be temporarily filled.

Further, since the diverting agent of the present invention is water-soluble and biodegradable, the diverting agent is rapidly dissolved in water and removed after use, and is then biodegraded. Therefore, the environmental load is small, and the diverting agent is very useful.

EXAMPLES

Hereinafter, the present invention will be described more specifically with reference to Examples and Comparative Examples, but the present invention is not limited to these Examples. In the following Examples and Comparative Examples, "parts" and "%" are based on mass unless otherwise specified.

Production Example 1: Production of PVA-Based Resin Particles (PVA1)

Into a reaction can equipped with a reflux condenser, a dripping device, and a stirrer, 20 parts of vinyl acetate (20% of the total for initial charge), 32.5 parts of methanol and 0.40 parts of 3,4-diacetoxy-1-butene (20% of the total for initial charge) were charged, the temperature was raised under a nitrogen stream while stirring to reach the boiling point, and then 0.093 part of acetyl peroxide was added to start polymerization. After 0.4 hour from the start of polymerization, 80 parts of vinyl acetate and 1.60 parts of 3,4-diacetoxy-1-butene were dropped at a constant speed over 11 hours. When the polymerization rate of vinyl acetate was 92%, a predetermined amount of hydroquinone monomethyl ether was added to complete the polymerization, and then distillation was performed while blowing methanol vapor to remove unreacted vinyl acetate monomer out of the system to obtain a methanol solution of a copolymer.

Then, the above solution was diluted with methanol and adjusted to have a solid content concentration of 55%. The solution temperature was maintained at 45° C., and a methanol solution of 2% sodium hydroxide (in terms of sodium) was added in an amount of 12 mmol with respect to 1 mol (total amount) of vinyl acetate structural units and 3,4-diacetoxy-1-butene structural units in the copolymer, thereby performing saponification. As the saponification proceeded, a saponified product was precipitated, and when the form of the precipitated saponified product was turned into a cake shape, the cake was crushed. Thereafter, acetic acid for neutralization was added in an amount of 0.3 equivalent per 1 equivalent of sodium hydroxide. The saponified product was filtered, well washed with methanol and dried in a hot air dryer, to obtain modified PVA-based resin particles having a side-chain 1,2-diol structural unit (side-chain 1,2-diol structural unit-containing modified PVA-based resin particles, PVA1).

The obtained PVA1 was in the form of powder and was sieved by a dry sieving test method to calculate the particle diameter at which the integrated value was 50%. The average particle diameter of PVA1 was 750 μm.

The degree of saponification of PVA1 was analyzed by alkali consumption required for hydrolysis of the residual vinyl acetate and 3,4-diacetoxy-1-butene structural units in the resin, and was found to be 99.3 mol %. The average polymerization degree was 450 when analyzed according to JIS K 6726:1994.

In PVA1, the content (modification rate) of the 1,2-diol structural unit represented by the above formula (1) was calculated based on an integrated value determined by $^1$H-NMR (300 MHz proton NMR, a $d_6$-DMSO solution, internal standard substance: tetramethylsilane, 50° C.), and was found to be 1.0 mol %.

Production Example 2: Production of PVA-Based Resin Particles (PVA2)

Side-chain 1,2-diol structural unit-containing modified PVA-based resin particles (PVA2) were obtained in the same manner as in Production Example 1, except that a methanol solution of 2% sodium hydroxide (in terms of sodium) was added in an amount of 10 mmol with respect to 1 mol (total amount) of the vinyl acetate structural units and the 3,4-diacetoxy-1-butene structural units to perform saponification.

The obtained PVA2 was in the form of powder and had an average particle diameter of 750 μm, a degree of saponification of 98.9 mol %, an average polymerization degree of 450, and a modification rate of 1.0 mol %.

Production Example 3: Production of PVA-Based Resin Particles (PVA3)

Side-chain 1,2-diol structural unit-containing modified PVA-based resin particles (PVA3) were obtained in the same manner as in Production Example 1, except that a methanol solution of 2% sodium hydroxide (in terms of sodium) was added in an amount of 8 mmol with respect to 1 mol (total amount) of the vinyl acetate structural units and the 3,4-diacetoxy-1-butene structural units to perform saponification.

The obtained PVA3 was in the form of powder and had an average particle diameter of 750 μm, a degree of saponification of 98.5 mol %, an average polymerization degree of 450, and a modification rate of 1.0 mol %.

Production Example 4: Production of PVA-Based Resin Particles (PVA4)

Side-chain 1,2-diol structural unit-containing modified PVA-based resin particles (PVA4) were obtained in the same manner as in Production Example 1, except that unlike the above Production Example 1, the charged vinyl acetate was 100 parts, methanol was 18 parts, and 3,4-diacetoxy-1-butene was 3 parts, and the polymerization was completed when the polymerization rate of vinyl acetate was 96% in the polymerization reaction, and a methanol solution of 2% sodium hydroxide (in terms of sodium) was added in an amount of 13 mmol with respect to 1 mol (total amount) of the vinyl acetate structural units and the 3,4-diacetoxy-1-butene structural units to perform saponification.

The obtained PVA4 was in the form of powder and had an average particle diameter of 1170 μm, a degree of saponification of 99.5 mol %, an average polymerization degree of 600, and a modification rate of 1.5 mol %.

Production Example 5: Production of PVA-Based Resin Particles (PVA5)

Side-chain 1,2-diol structural unit-containing modified PVA-based resin particles (PVA5) were obtained in the same manner as in Production Example 4, except that a methanol solution of 2% sodium hydroxide (in terms of sodium) was added in an amount of 10 mmol with respect to 1 mol (total amount) of the vinyl acetate structural units and the 3,4-diacetoxy-1-butene structural units to perform saponification.

The obtained PVA5 was in the form of powder and had an average particle diameter of 1170 μm, a degree of saponification of 99.2 mol %, an average polymerization degree of 600, and a modification rate of 1.5 mol %.

Production Example 6: Production of PVA-Based Resin Particles (PVA6)

Side-chain 1,2-diol structural unit-containing modified PVA-based resin particles (PVA6) were obtained in the same manner as in Production Example 1, except that unlike the above Production Example 1, the charged vinyl acetate was 100 parts, methanol was 18 parts, and 3,4-diacetoxy-1-butene was 3 parts, and the polymerization was completed when the polymerization rate of vinyl acetate was 96% in the polymerization reaction, and a methanol solution of 2% sodium hydroxide (in terms of sodium) was added in an amount of 13.5 mmol with respect to 1 mol (total amount) of the vinyl acetate structural units and the 3,4-diacetoxy-1-butane structural units to perform saponification.

The obtained PVA6 was in the form of powder and had an average particle diameter of 680 μm, a degree of saponification of 99.2 mol %, an average polymerization degree of 600, and a modification rate of 1.5 mol %.

Production Example 7: Production of PVA-Based Resin Particles (PVA7)

Side-chain 1,2-diol structural unit-containing modified PVA-based resin particles were obtained in the same manner as in Production Example 1, except that unlike the above Production Example 1, the charged vinyl acetate was 100 parts, methanol was 32.5 parts, and 3,4-diacetoxy-1-butene was 4 parts, and the polymerization was completed when the polymerization rate of vinyl acetate was 91% in the polymerization reaction.

The obtained side-chain 1,2-diol structural unit-containing modified PVA-based resin particles had a degree of saponification of 99.0 mol %, an average polymerization degree of 530, and a modification rate of 2.0 mol %.

The above-obtained side-chain 1,2-diol structural unit-containing modified PVA-based resin particles were charged into an extruder, and 500 ppm of magnesium stearate and 500 ppm of magnesium 12-hydroxystearate were further mixed, melt-kneaded under the following conditions, air-cooled to solidify, and then cut using a cutter (strand cutting method). Thereafter, drying was performed to obtain side-chain 1,2-diol structural unit-containing modified PVA-based resin particles (PVA7) in a cylindrical shape having a diameter of 2.6 mm and an axial length of 3 mm.

(Melt-kneading conditions)
Extruder: 15 mm in diameter, ID=60, manufactured by Technovel Corporation
Rotation speed: 200 rpm
Discharge rate: 1.2 to 1.5 kg/h
Extrusion temperature: C1/C2/C3/C4/C5/C6/C7/C8/D=90/170/200/215/215/220/225/225/225 (° C.)

Production Example 8: Production of PVA-Based Resin Particles (PVA8)

Side-chain 1,2-diol structural unit-containing modified PVA-based resin particles (PVA8) in a cylindrical shape were obtained in the same manner as in Production Example 7, except that unlike the above Production Example 7, the cutting size was 2.6 mm in diameter and 1.8 mm in axial length.

Production Example 9: Production of PVA-Based Resin Particles (PVA9)

Side-chain 1,2-diol structural unit-containing modified PVA-based resin particles (PVA9) in a cylindrical shape were obtained in the same manner as in Production Example 7, except that unlike the above Production Example 7, the cutting size was 2.6 mm in diameter and 1.1 mm in axial length.

Table 1 summarizes the degree of saponification, the modification rate, the polymerization degree, and the particle size (particle diameter) of PVA1 to PVA9 produced in Production Examples 1 to 9.

TABLE 1

| | Shape | Degree of saponification (mol %) | Modification rate (mol %) | Average polymerization degree | Particle diameter | |
|---|---|---|---|---|---|---|
| PVA1 | Powder | 99.3 | 1.0 | 450 | Average | 750 μm |
| PVA2 | Powder | 98.9 | 1.0 | 450 | Particle | 750 μm |
| PVA3 | Powder | 98.5 | 1.0 | 450 | Diameter | 750 μm |
| PVA4 | Powder | 99.5 | 1.5 | 600 | | 1170 μm |
| PVA5 | Powder | 99.2 | 1.5 | 600 | | 1170 μm |
| PVA6 | Powder | 99.2 | 1.5 | 600 | | 680 μm |
| PVA7 | Pellet | 99.0 | 2.0 | 530 | Partical size | Cylindrical shape having diameter of 2.6 mm and axial length of 3 mm |
| PVA8 | Pellet | 99.0 | 2.0 | 530 | | Cydrincal shape having diameter of 2.6 mm and axial length of 1.8 mm |
| PVA9 | Pellet | 99.0 | 2.0 | 530 | | Cylindrical shape having diameter of 2.6 mm and axial length of 1.1 mm |

Example 1

PVA1 and PVA7 were uniformly mixed at a ratio of 90% and 10% to obtain a particle mixture.

Example 2

PVA1 and PVA7 were uniformly mixed at a ratio of 80% and 20% to obtain a particle mixture.

Example 3

PVA1 and PVA7 were uniformly mixed at a ratio of 70% and 30% to obtain a particle mixture.

Example 4

PVA1 and PVA7 were uniformly mixed at a ratio of 50% and 50/o to obtain a particle mixture.

Example 5

PVA2 and PVA7 were uniformly mixed at a ratio of 80% and 20% to obtain a particle mixture.

Example 6

PVA3 and PVA7 were uniformly mixed at a ratio of 80% and 20% to obtain a particle mixture.

Example 7

PVA4 and PVA7 were uniformly mixed at a ratio of 80% and 20% to obtain a particle mixture.

Example 8

PVA5 and PVA7 were uniformly mixed at a ratio of 80% and 20% to obtain a particle mixture.

Example 9

PVA1 and PVA8 were uniformly mixed at a ratio of 80% and 20% to obtain a particle mixture.

Example 10

PVA1 and PVA9 were uniformly mixed at a ratio of 80% and 20% to obtain a particle mixture.

Example 11

PVA1, PVA7, and PVA8 were uniformly mixed at a ratio of 80%, 10%, and 10% to obtain a particle mixture.

Example 12

PVA1, PVA7, and PVA9 were uniformly mixed at a ratio of 80%, 10%, and 10% to obtain a particle mixture.

Comparative Example 1

PVA6 and PVA7 were uniformly mixed at a ratio of 80% and 20% to obtain a particle mixture.

Reference Example 1

Polylactic acid (PLA, "Ingeo 4032D" manufactured by Nature Works) was used.

<Pressure Dehydration Test>

The dehydration amount of the dispersion liquid in which the particles of each example were dispersed was measured using a pressure dehydration device "HPHT Filter Press 500CT" manufactured by Fann Instrument Company.

The particle mixture was added to a 0.48 mass % aqueous solution of guar gum to prepare a mixed solution having a concentration of the particle mixture of 12 mass %. This mixed solution was stirred at 23° C. for 60 minutes and dispersed to obtain a dispersion liquid.

Next, a slit of a drainage part of the pressure dehydration device was set to a width of 2 mm, and a pressure of 1 MPa was applied for pressure dehydration.

The dehydration amount every 0.5 minutes from the start of pressurization (0 minute) to 5 minutes later was measured, and the cumulative dehydration amount y with respect to the square root x of the time was determined. A regression line represented by the following equation (A) was calculated by the least squares method from a scatter diagram plotted in a graph in which the square root x of the time is plotted on a horizontal axis and the cumulative dehydration amount y is plotted on a vertical axis. In the equation (A), when a is 80 or less, it can be evaluated that the durability of the filling time is exhibited. The results for each example are shown in Table 2.

$$y = ax + b \quad (A)$$

(In the equation (A), y is the cumulative dehydration amount (g), x is the square root of the time (minutes) elapsed from start of pressurization, a and b are the slope and an intercept of the regression line, respectively, and $0 < x \leq 2$).

TABLE 2

| | Composition of particles | | | | | | Slope a of equation (A) |
|---|---|---|---|---|---|---|---|
| | Powder | Mass % | Pellet | Mass % | Pellet | Mass % | |
| Example 1 | PVA1 | 90 | PVA7 | 10 | — | — | 22 |
| Example 2 | PVA1 | 80 | PVA7 | 20 | — | — | 42 |
| Example 3 | PVA1 | 70 | PVA7 | 30 | — | — | 45 |
| Example 4 | PVA1 | 50 | PVA7 | 50 | — | — | 55 |
| Example 5 | PVA2 | 80 | PVA7 | 20 | — | — | 49 |
| Example 6 | PVA3 | 80 | PVA7 | 20 | — | — | 71 |
| Example 7 | PVA4 | | | | — | — | 25 |
| Example 8 | PVA5 | 80 | PVA7 | 20 | — | — | 33 |
| Example 9 | PVA1 | 80 | PVA8 | 20 | — | — | 29 |
| Example 10 | PVA1 | 80 | PVA9 | 20 | — | — | 30 |
| Example 11 | PVA1 | 80 | PVA7 | 10 | PVA8 | 10 | 46 |
| Example 12 | PVA1 | 80 | PVA7 | 10 | PVA9 | 10 | 38 |
| Comparative Example 1 | PVA6 | 80 | PVA7 | 20 | — | — | 89 |
| Reference Example 1 | | | PLA | | | | Immeasurable because of being totally dehydrated at initial stage |

From the results in Table 2, the slope a in the equation (A) is 80 or less in Examples 1 to 12. Therefore, it is found that in Examples 1 to 12, water does not easily flow during pressurization, and the durability of the filling is exhibited as well as in the initial stage of the filling. Therefore, it is found that when filling the fractures in the well, sufficient filling property and durability of the filling time can be exhibited.

Although the present invention has been described in detail with reference to specific embodiments, it will be apparent to those skilled in the art that various changes and modifications can be made without departing from the spirit and scope of the present invention. This application is based on a Japanese Patent Application (Japanese Patent Application No. 2019-023947) filed on Feb. 13, 2019, the contents of which are incorporated herein by reference.

The invention claimed is:

1. A diverting agent, comprising:
a polyvinyl alcohol-based resin, wherein
when the diverting agent is added to a 0.48 mass % aqueous solution of guar gum to prepare a mixed solution having a concentration of 12 mass % of the diverting agent, the mixed solution is dispersed at 30° C. for 60 minutes to obtain a dispersion liquid, the dispersion liquid is pressurized and dehydrated at a pressure of 1 MPa using a pressure dehydration device including a drainage part having a slit having a width of 2 mm, a cumulative dehydration amount y with respect to a square root x of a time is obtained, and a regression line represented by the following equation (A) is calculated by a least squares method from a scatter diagram plotted on a graph in which the square root x of the time is plotted on a horizontal axis and the cumulative dehydration amount y is plotted on a vertical axis, a slope a of the equation (A) satisfies the following condition (B)

$$y = ax + b \tag{A}$$

$$a \leq 80 \tag{B}$$

wherein in the equation (A), y is the cumulative dehydration amount, x is the square root of the time in minutes elapsed from start of pressurization, a and b are the slope and an intercept of the regression line, respectively, and $0 < x \leq 2$.

2. The diverting agent according to claim 1, wherein the polyvinyl alcohol-based resin contains two or more types of resin particles that are in the form of particles and have different average particle diameters.

3. The diverting agent according to claim 1, wherein the polyvinyl alcohol-based resin contains a modified polyvinyl alcohol-based resin.

4. A method for preparing a diverting agent for temporarily filling a fracture generated in a well, the method comprising:
incorporating a polyvinyl alcohol-based resin, wherein
when the diverting agent is added to a 0.48 mass % aqueous solution of guar gum to prepare a mixed solution having a concentration of 12 mass % of the diverting agent, the mixed solution is dispersed at 30° C. for 60 minutes to obtain a dispersion liquid, the dispersion liquid is pressurized and dehydrated at a pressure of 1 MPa using a pressure dehydration device including a drainage part having a slit having a width of 2 mm, a cumulative dehydration amount y with respect to a square root x of a time is obtained, and a regression line represented by the following equation (A) is calculated by a least squares method from a scatter diagram plotted on a graph in which the square root x of the time is plotted on a horizontal axis and the cumulative dehydration amount y is plotted on a vertical axis, a slope a of the equation (A) satisfies the following condition (B)

$$y = ax + b \tag{A}$$

$$a \leq 80 \tag{B}$$

wherein in the equation (A), y is the cumulative dehydration amount, x is the square root of the time in minutes elapsed from start of pressurization, a and b are the slope and an intercept of the regression line, respectively, and $0 < x \leq 2$.

5. A method of temporarily filling a fracture generated in a well, the method comprising:
allowing the diverting agent according to claim 1 to flow into a fracture with a flow of a fluid in the well.

* * * * *